United States Patent
Sridhara et al.

(10) Patent No.: US 10,719,392 B1
(45) Date of Patent: Jul. 21, 2020

(54) SELECTIVE SAMPLING FOR DATA RECOVERY

(71) Applicant: Seagate Technology LLC, Cupertino, CA (US)

(72) Inventors: Deepak Sridhara, Longmont, CO (US); Ara Patapoutian, Hopkinton, MA (US)

(73) Assignee: Seagate Technology LLC, Fremont, CA (US)

( * ) Notice: Subject to any disclaimer, the term of this patent is extended or adjusted under 35 U.S.C. 154(b) by 206 days.

(21) Appl. No.: 16/020,013

(22) Filed: Jun. 27, 2018

(51) Int. Cl.
- *G06F 11/10* (2006.01)
- *G06F 11/14* (2006.01)
- *G11B 5/012* (2006.01)
- *G11B 20/12* (2006.01)

(52) U.S. Cl.
CPC ...... *G06F 11/1028* (2013.01); *G06F 11/1402* (2013.01); *G11B 5/012* (2013.01); *G11B 20/1217* (2013.01); *G11B 2020/1222* (2013.01); *G11B 2020/1232* (2013.01)

(58) Field of Classification Search
CPC .................................................. G06F 11/1028
USPC ........................................................ 714/799
See application file for complete search history.

(56) References Cited

U.S. PATENT DOCUMENTS

| | | | |
|---|---|---|---|
| 6,009,549 A | 12/1999 | Bliss et al. | |
| 6,317,850 B1 | 11/2001 | Rothberg | |
| 6,405,342 B1 | 6/2002 | Lee | |
| 6,604,220 B1 | 8/2003 | Lee | |
| 7,340,003 B1 | 3/2008 | Nazad et al. | |
| 7,392,463 B2 | 6/2008 | Fujiwara et al. | |
| 7,444,582 B1 | 10/2008 | Au et al. | |
| 7,665,007 B2 | 2/2010 | Yang et al. | |
| 7,814,398 B2 | 10/2010 | Djurdjevic et al. | |
| 8,225,181 B2 | 7/2012 | Perlmutter et al. | |
| 8,335,977 B2 | 12/2012 | Weingarten et al. | |
| 8,375,274 B1 | 2/2013 | Bonke | |
| 8,769,380 B1 | 7/2014 | Burd et al. | |
| 9,015,549 B2 | 4/2015 | Rub et al. | |
| 9,042,045 B1 | 5/2015 | Dang et al. | |
| 9,311,939 B1 | 4/2016 | Malina et al. | |
| 9,837,115 B1 | 12/2017 | Sridhara et al. | |
| 2008/0270874 A1 | 10/2008 | Ozdemir | |
| 2010/0262886 A1 | 10/2010 | Ren | |

(Continued)

OTHER PUBLICATIONS

Sridhara, "Efficient Read and Recovery With Outer Code", U.S. Appl. No. 15/345,440, filed Nov. 7, 2016.

(Continued)

*Primary Examiner* — Fritz Alphonse
(74) *Attorney, Agent, or Firm* — Setter Roche LLP; Kirk A. Cesari

(57) ABSTRACT

Systems and methods are disclosed for error recovery in a digital data channel. In an error recovery approach when the hardware fails to recover a sector, the sample for that sector can be saved along with a metric measure that indicates the quality of the sample. This process can begin from a first on-the-fly receiving and decoding of data. During each step of error recovery, a retry attempt may either use samples obtained during a new decoding attempt or may use a sample, or a combination of samples, having the best metric from an earlier attempt, or a combination of earlier attempts, to perform the recovery during a current retry recovery attempt.

20 Claims, 5 Drawing Sheets

(56) References Cited

U.S. PATENT DOCUMENTS

2013/0170063 A1* 7/2013 Yang ................ G11B 20/10046
360/53
2019/0041845 A1* 2/2019 Cella ................ G05B 19/41875
2019/0324444 A1* 10/2019 Cella ................ G05B 19/41865
2019/0339688 A1* 11/2019 Cella .................... G06K 9/6263

OTHER PUBLICATIONS

Sridhara, "Iterative Outer Code Recovery Using Data From Multiple Reads", U.S. Appl. No. 15/345,437, filed Nov. 7, 2016.
Sridhara, "Syndrome Update and Maintenance", U.S. Appl. No. 15/346,651, filed Nov. 8, 2018.

* cited by examiner

US 10,719,392 B1

SELECTIVE SAMPLING FOR DATA RECOVERY

SUMMARY

In certain embodiments, a device may comprise a data decoding circuit configured to generate a first sample for a first unrecovered sector of data from a first decoding of data; generate a first quality metric for the first sample; generate a second sample for the first unrecovered sector from a second determination (e.g. second decoding or other method to determine) of the data; generate a second quality metric for the second sample; compare the first quality metric to the second quality metric; select one of the first sample and the second sample based on the comparison of the first quality metric and the second quality metric to produce a first selected sample; and perform an error recovery process on the data utilizing the first selected sample.

In certain embodiments, a method may comprise generating a first sample for a first unrecovered sector of data from a first decoding of data; generating a first quality metric for the first sample; generating a second sample for the first unrecovered sector from a second decoding of the data; generating a second quality metric for the second sample; comparing the first quality metric to the second quality metric; selecting one of the first sample and the second sample based on the comparison of the first quality metric and the second quality metric to produce a first selected sample; and performing an error recovery process on the data utilizing the first selected sample.

In certain embodiments, a device may comprise a data channel circuit including a memory, an input to receive data, a data decoding circuit, and an output to provide recovered codewords from the data decoding circuit. The data decoding circuit may be configured to: generate a first sample for a first unrecovered sector of data from a first decoding of data; generate a first quality metric for the first sample; generate a second sample for the first unrecovered sector from a second decoding of the data; generate a second quality metric for the second sample; compare the first quality metric to the second quality metric; select one of the first sample and the second sample based on the comparison of the first quality metric and the second quality metric to produce a first selected sample; and perform an error recovery process on the data utilizing the first selected sample.

DETAILED DESCRIPTION

Figure 1:
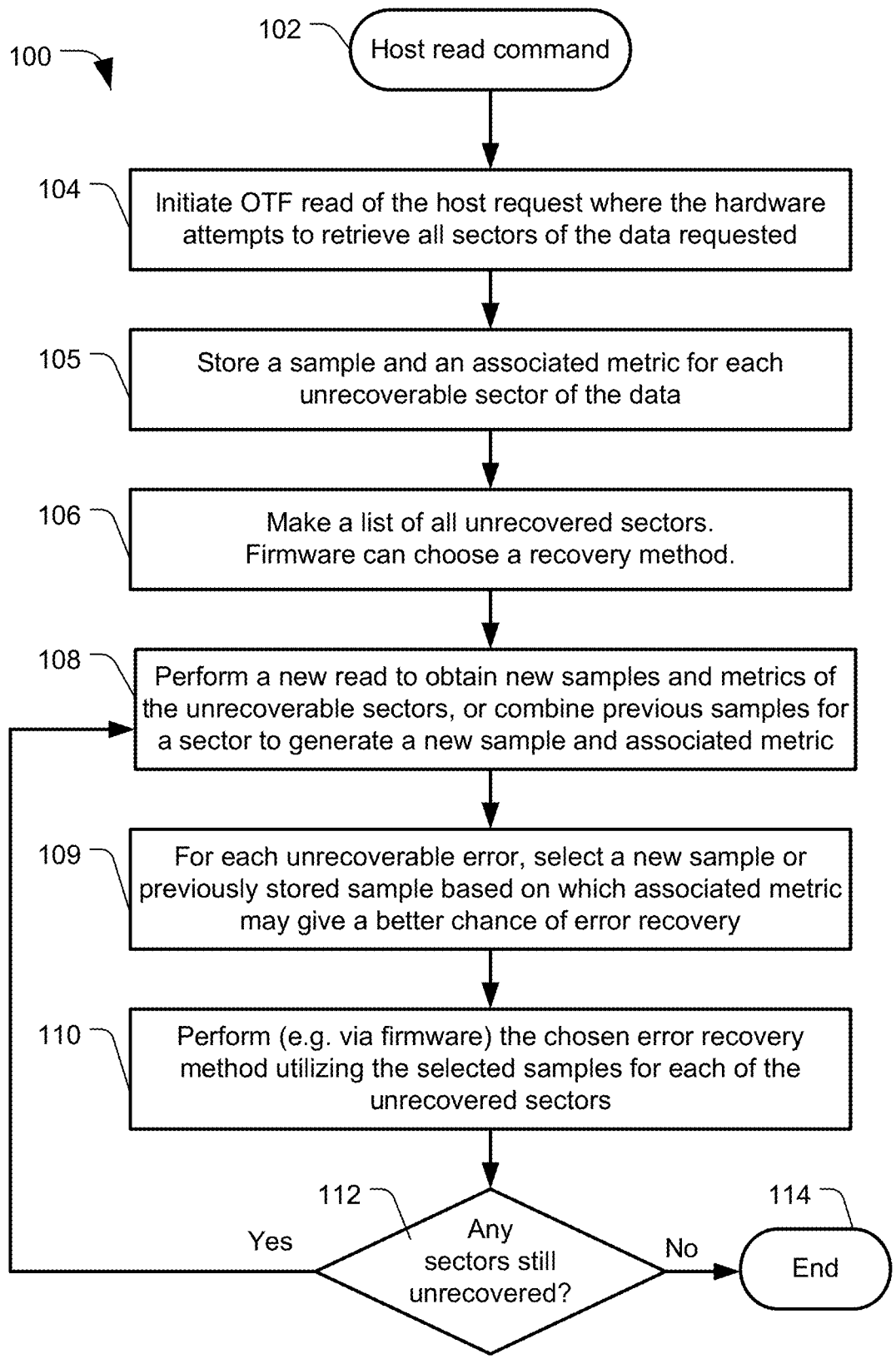
FIG. 1 is a diagram of a method of selective sampling for data recovery, in accordance with certain embodiments of the present disclosure.

In the following detailed description of certain embodiments, reference is made to the accompanying drawings which form a part hereof, and in which are shown by way of illustration of example embodiments. Features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Embodiments of the disclosure may provide a method and apparatus for recovering data from a transmission medium (e.g. a data storage medium of a data storage device). When data is received (e.g. requested by a host from a data storage device such as a hard drive), the received data (e.g. read data) may be checked to determine if it has any errors. For example, a syndrome, such as an outer code syndrome, may be generated for a portion of received data to indicate whether it contains errors. In some embodiments, the syndrome may be utilized to detect errors once the full data unit or outer code block is read. Received data that contains errors may then be decoded using various decoding techniques, the requested failed data may be attempted to be re-read from the storage medium, or various combinations of both. This outer code recovery process may work iteratively, where each iterative decoding cycle may produce information usable by a later decoding attempt.

Further, outer codes may be used with inner codes to improve the tolerance to defects, for example, by allowing one or more inner code failures. For example, LDPC (low density parity check) codes (which may generally be included in an inner code) may trade off performance to lower the error floor below the unrecoverable error rate. With an outer code as a safety mechanism, the error floor may be relaxed and LDPC codes may be optimized for performance. While many of the processes and methods discussed herein refer to iterative outer codes, they may be applied to any type of iterative decoding, error recovery process, or a combination thereof.

FIG. 1 is a diagram of a method of selective sampling for data recovery, generally designated 100, in accordance with certain embodiments of the present disclosure. The process 100 may be utilized by an electronic communication channel, such as can be built in an ASIC (application specific integrated circuit) or SOC (system on chip), to improve data accuracy upon decoding after reception of the data at the decoding channel.

The following description will be provided utilizing an example embodiment of a data storage device, such as a hard disc drive, implementing the method 100. The method 100 may include receiving a command to initiate the process, such as the data storage device receiving a read command from a host computer, at 102. The data storage device may initiate a read of the data from a data storage medium and transmit the data to the data decoding channel, at 104. The data storage device, or the data channel circuit itself, may store a sample for each unrecoverable portion of the data (e.g. each unrecoverable sector) and an associated metric for each sample into a memory, such as a solid state memory (e.g. DRAM), at 105.

The data channel may make a list of all samples for each unrecoverable portion (e.g. unrecoverable sectors) of the received data, at 106. The data channel may then implement an error recovery method, at 106, based on the list of unrecovered sectors. For example, on a first read (i.e., on-the-fly (OTF) read) of a host request, the hardware may attempt to recover all the sectors requested by the host. At the end of this read, the sectors/data that were not recovered are known to the data channel/firmware and an error recovery process can be initiated to attempt to recover these unrecovered sectors. The error recovery process may involve different error recovery algorithms such as re-reads, sample averaged reads (SERV), etc. For example, one of the error recovery attempts may be an outer code error recovery process or another error recovery process. The method 100 may select different error recovery processes on various iterations of the method 100 based on the number or errors, locations of errors, previous metrics, other criteria, or any combination thereof. In some embodiments, the method 100 can select an error recovery method to implement based on a number of iterations of error recovery have been attempted or based on the quality of errors in the unrecovered sectors if they can be captured in the associated metrics.

The method 100 may then perform another analysis of the received data, e.g. in some embodiments perform another read of the data from the data storage medium, at 108, to obtain new samples of the unrecoverable portion(s) and a new associated metric for each sample. In other examples, the method 100 may combine data from multiple previous reads to form a new set of data, which can be stored as samples, and associated metrics, at 108.

The method 100 may select, for each of the unrecoverable portions, a stored sample to use based on its associated metric, at 109. A sample for each unrecoverable portion may be selected based on a determination of the associated metric that indicates which stored sample gives the error recovery process a better chance of success to correct the unrecoverable portion(s). The method 100 may then perform a selected recovery process utilizing the selected samples, at 110. The selected unrecoverable samples do not need to be from a single instance of error detection that generated the samples; thus, the selected samples can have a sample selected from any of the multiple iterations of the sample generation process for each of the unrecoverable portions.

The process 100 may then determine if all of the unrecoverable portions have been recovered, at 112. If the process 100 has recovered all the portions, the process 100 may end, at 114. If all the unrecoverable portions have not been corrected, at 112, the process 100 may repeat to obtain new samples of the unrecoverable sectors, such as at 108. In some embodiments, the process 100 may only obtain new samples of the unrecoverable sectors and not any samples of sectors that have been recovered.

The method 100 can begin from the first on-the-fly attempt at decoding the data. During each step of error recovery, a retry attempt may either use samples obtained during a new read attempt or may use the samples having the best metric from an earlier attempts to perform the recovery during the current retry attempt.

Figure 2:
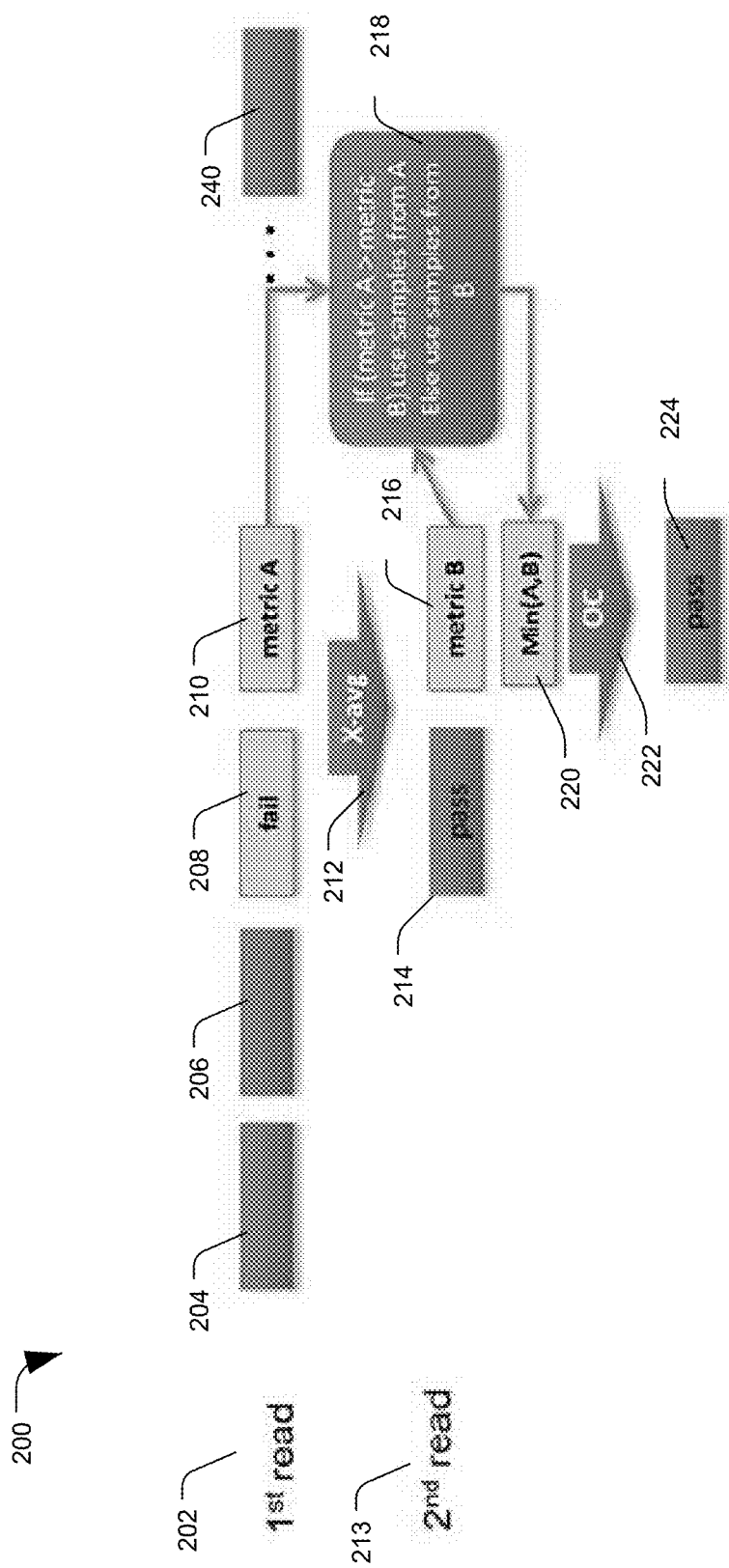
FIG. 2 is a diagram of a method of selective sampling for data recovery, in accordance with certain embodiments of the present disclosure.

FIG. 2 is a diagram of a method of selective sampling for data recovery, generally designated 200, in accordance with certain embodiments of the present disclosure. Method 200 is an example of an implementation of the method 100.

During a first reception of data, such as a first read attempt, at 202, the data channel may receive the data and determine which portions have recoverable data and which portions have unrecoverable data. FIG. 2 shows portions 204 and 206 as recoverable, as designated by "pass", and portion 208 as unrecoverable, as designated by "fail". The data of portion 208 can be stored in memory along with an associated metric 210.

In some embodiments, a second sample 214 may be generated directly from a first sample 208 for each of the unrecovered sectors. The second sample 214 may come from a second read or decoding attempt, such as a second read attempt, at 213. The second read data may be combined, at 212, with data from the first sample to generate the second sample 214 from post-processing steps, such as ADC sample averaging, equalized sample averaging (SERV), ATIC averaging, or any other error recovery attempt where the samples obtained had a better metric than any of the other attempts.

Once the second sample 214 and a second metric 216 associated therewith is obtained, the method 200 can selectively utilize a best sample 220 that has a better metric than any of the other samples, at 218. The selected best sample 220 can be utilized for the next iteration of error recovery, at 222. The method 200 may repeat until a recoverable portion 224 is acquired, or until some other interrupt occurs (e.g. timeout, maximum number of iterations reached, etc.).

For example, suppose during a first read, sectors 10, 14, 22, and 36 were not recovered, then in the proposed method, the samples and the metrics for the samples for these four sectors would be saved (e.g. in DRAM, as a possibility, or in the hardware memory, etc.). Then, on a first recovery attempt of these four sectors, sector 14 was recovered but the remaining three sectors were not. Second samples and metrics for these sectors would be saved from the first recovery attempt. Then, for a second recovery attempt, the proposed method could do a read of the sectors to acquire third samples and if the third samples from the read had an inferior metric compared to the samples from the previous two read attempts, the recovery method would use the samples for each sector from the read attempt that had the best metric for that sector. Thus, the recovery method could have chosen to use samples from the earlier two read attempts without having to perform a new read.

As another example, if the second recovery attempt was a SERV-2 averaging read attempt, then either a) a new read attempt can be made to acquire a new set of samples and a metric for the remaining unrecovered sectors where the SERV-2 process combines the best two sets of samples for each of the sectors from the three reads (e.g. OTF read, off-track read, SERV read) for each of the three sectors, or b) SERV-2 process combines the samples from the previous two reads (e.g. OTF read, off-track read) for each of the three sectors. Furthermore, in (a) or (b) above, since each set of sample is associated with a metric, SERV-2 may be a weighted average instead of simple average, to weight the samples with a better metric higher than the samples with a poorer metric. The averaged samples would have an associated metric that can be used in a future recovery attempt if the SERV-2 recovery did not succeed.

Any process of combining the samples to obtain a new set of samples should also result in a new metric associated with this new set of samples for a sector.

Figure 3:
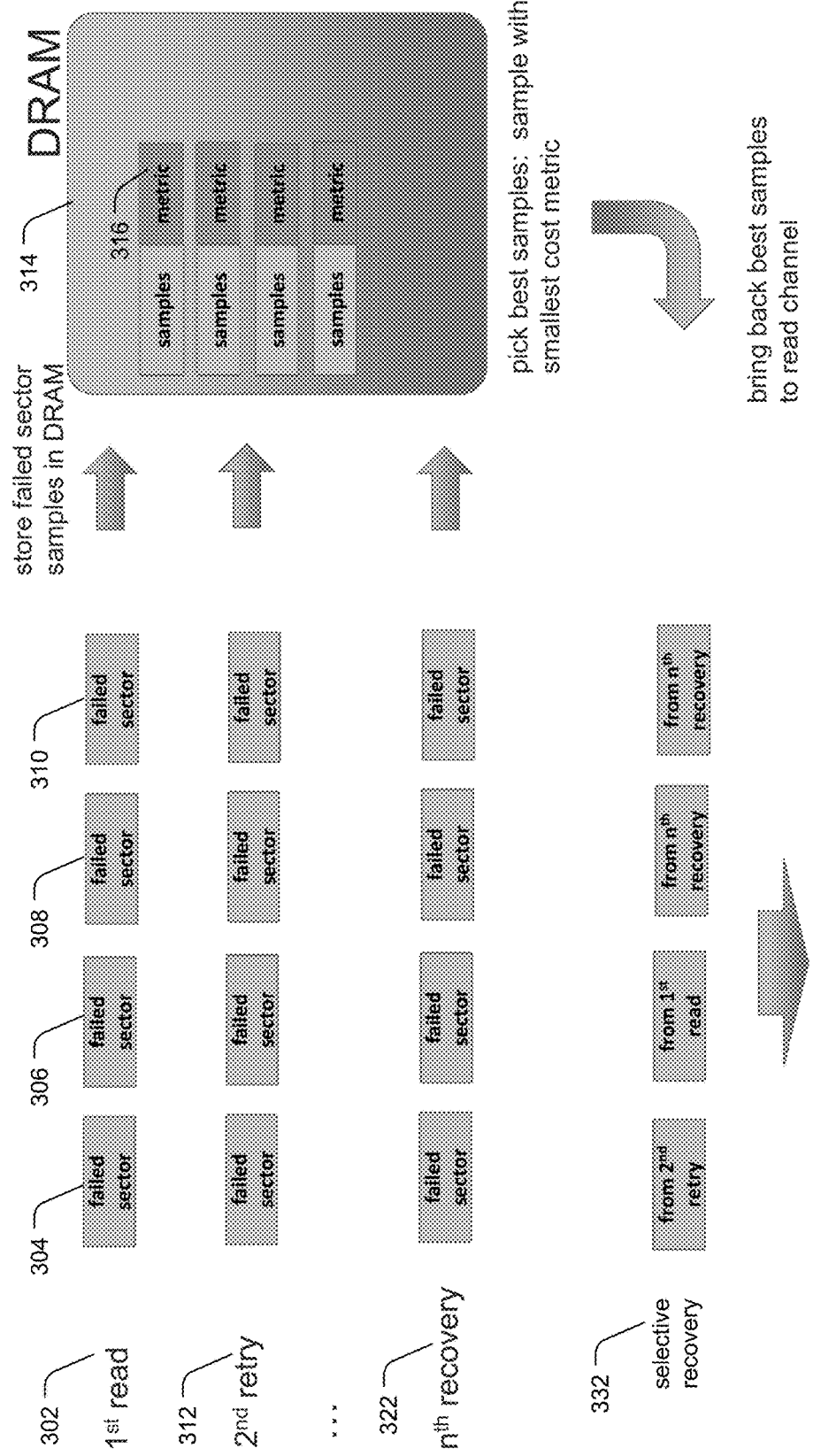
FIG. 3 is a diagram of a method of selective sampling for data recovery, in accordance with certain embodiments of the present disclosure.

FIG. 3 is a diagram of a method of selective sampling for data recovery, generally designated 300, in accordance with certain embodiments of the present disclosure. Method 300 shows an example implementation of method 100 and method 200. The method 300 may make multiple attempts at determining data or recovering data, at 302, 312, and 322. Each attempt may result in data from each failed sector (304, 306, 308, and 310) and an associated metric 316 being stored in memory 314 (e.g. DRAM). The method 300 may then pick the best samples for each failed sector to use for an selective recovery attempt, at 332.

As described above, the selective recovery attempt 332 may comprise data samples obtained from multiple of the previous read or recovery attempts. As shown in the example, the selective recovery attempt 332 may include a sample from the second retry, the first read, an two samples from an nth recovery attempt. If the selective recovery attempt 332 does not result in all of the failed sectors being recovered, those sectors that still have failures can be processed through the method again.

The described methods 100, 200, and 300 use the best samples to complement and assist different recovery attempts during the error recovery process; and, in some embodiments, increases an effectiveness of iterative outer code (IOC) recovery. This is accomplished by the use of a metric information of the samples from different read attempts for combining the samples in an optimal manner to make a current error recovery technique as effective as possible. The metric information may also be referred to as a quality metric.

The methods described herein can be utilized with staged error recovery steps that build on the successes of prior recovery steps. Error recovery techniques for only the unrecovered sectors can be attempted in every step of the error recovery process. While the methods are sometimes described in the context of outer code recovery, the same methods can be applied irrespective of whether outer code recovery is used or not. Further, staging the error recoveries using selected best samples can shorten error recovery time. This is generally due to the method only processing errors that are still unrecovered versus re-initiating a read process that attempts to re-determine all data regardless of what was previously recovered. Thus, the method improves the chance of recovering sectors and thereby reduces the overall recovery time.

Figure 4:
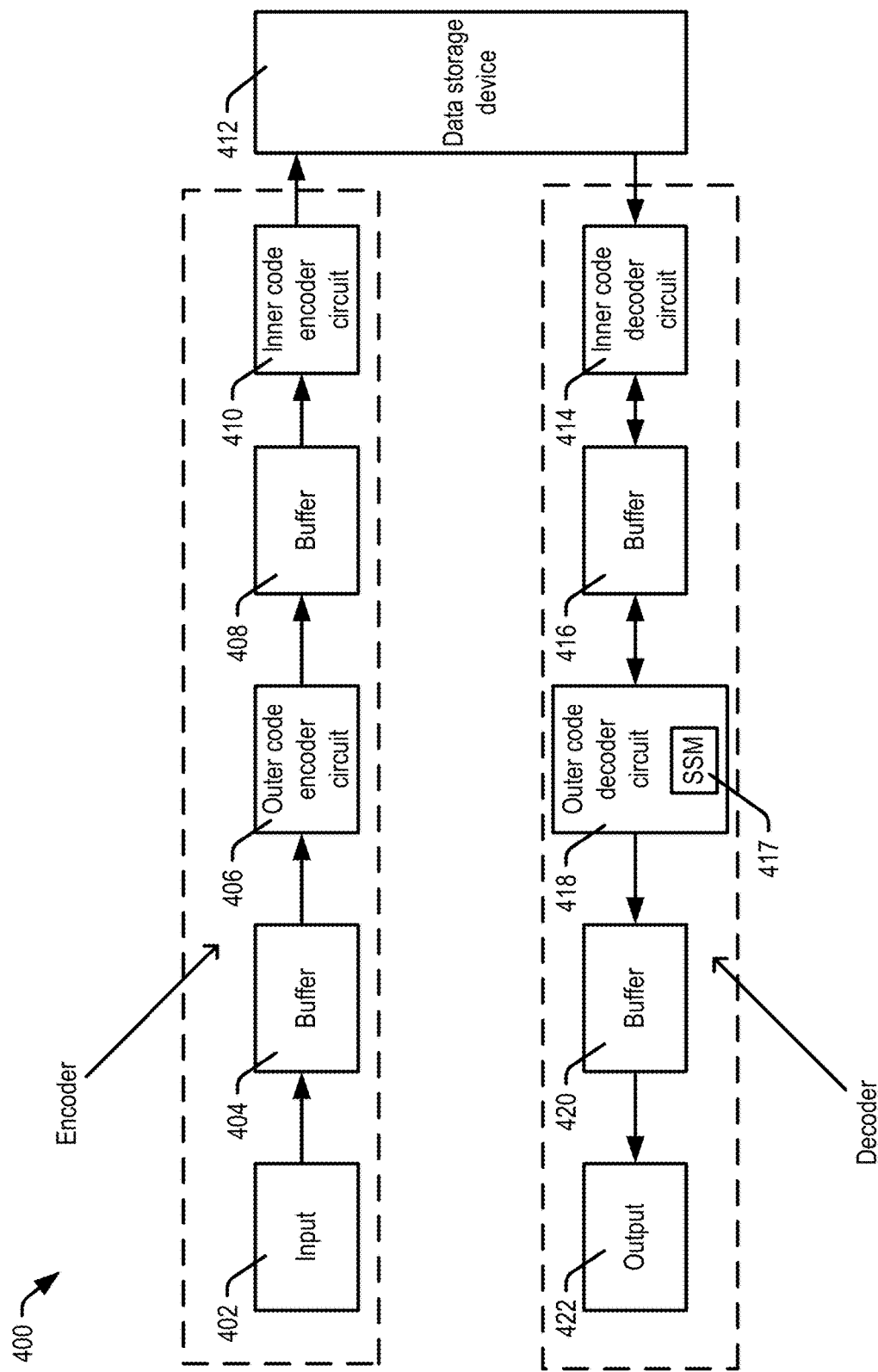
FIG. 4 is a diagram of a system of selective sampling for data recovery, in accordance with certain embodiments of the present disclosure.

Referring to FIG. 4, a system of selective sampling for data recovery is shown and generally designated 400. System 400 may be an example embodiment implementing methods 100, 200, or 300. System 400 can have an input 402, outer code encoder circuit 406, inner code encoder circuit 410, data storage device (DSD) 412, inner code decoder circuit 414, and outer code decoder circuit 418. System 400 may also include buffers 404, 408, 420, 416, and 422. The buffers may be located in the same memory device, or may be located in several memory devices.

Data from the input 402 can be stored in buffer 404, which may be volatile memory, non-volatile solid state memory, magnetic memory, other memory, or any combination thereof. The buffer 404 may accumulate data from multiple inputs simultaneously, or from the same input at different times. A processor, such as a controller, can send the input data to the outer code encoder circuit 406; the processor may send the input data to the outer code encoder circuit 406 based on triggers, such as the expiration of a timer, exceeding a threshold storage level in the buffer, and so forth.

The outer code encoder circuit 406 can determine the outer codes (e.g. outer code parity) corresponding to the input data. For example, the outer code encoder circuit 406 can determine the outer codes for two or more tracks of disc storage, pages of flash storage, other storage, or any combination thereof. The outer code encoder circuit 406 may also determine what method to use to encode the data (e.g. interleaved, non-interleaved, etc.). The input data and the corresponding parity data can be transferred to the inner code encoder circuit 410 via a buffer 408; in some embodiments, data may be transferred directly from the outer code encoder circuit 406 to the inner code encoder circuit 410. The inner code encoder circuit 410 can determine the inner code parity corresponding to the data sectors, which can include outer code parity data. The data storage device 412 can then store the input data, outer code parity data, and inner code parity data, to one or more storage media, such as magnetic media or flash memory. In some systems, such as radio transmission systems, the data storage device may be replaced with a non-structural transmission medium such as carrier waves.

While error free data can be provided from the medium 412, often there are errors in the transmitted data. Thus, the data may be sent to an inner code decoder circuit 414 to attempt to recover the data error(s). When the data error(s) are beyond the ability of the inner code decoder circuit 414 to repair, the data may be sent to the outer code decoder circuit 418 via a buffer 416. In some embodiments, data may be transferred from the inner code decoder circuit 414 to the outer code decoder circuit 418 without first being stored in the buffer 416. The outer code decoder circuit 418 can attempt to recover the data error(s). When the data recovery is successful, the data can be sent to the output 422 via a buffer 420. When the data recovery is not successful, the outer code decoder circuit 418 and the inner code decoder circuit 414 may iteratively repair data errors. Data may be sent from the outer code decoder circuit 418 to the inner code decoder circuit 414 during recovery iterations via the buffer 416.

In some embodiments, the outer code decoder circuit 418 can include a selective sampling module (SSM) 417 to implement the methods 100, 200, and 300, which may include circuits, firmware, or a combination thereof. The outer code decoder circuit 418 may store the samples and associated metrics from errors in the buffer 416.

Figure 5:
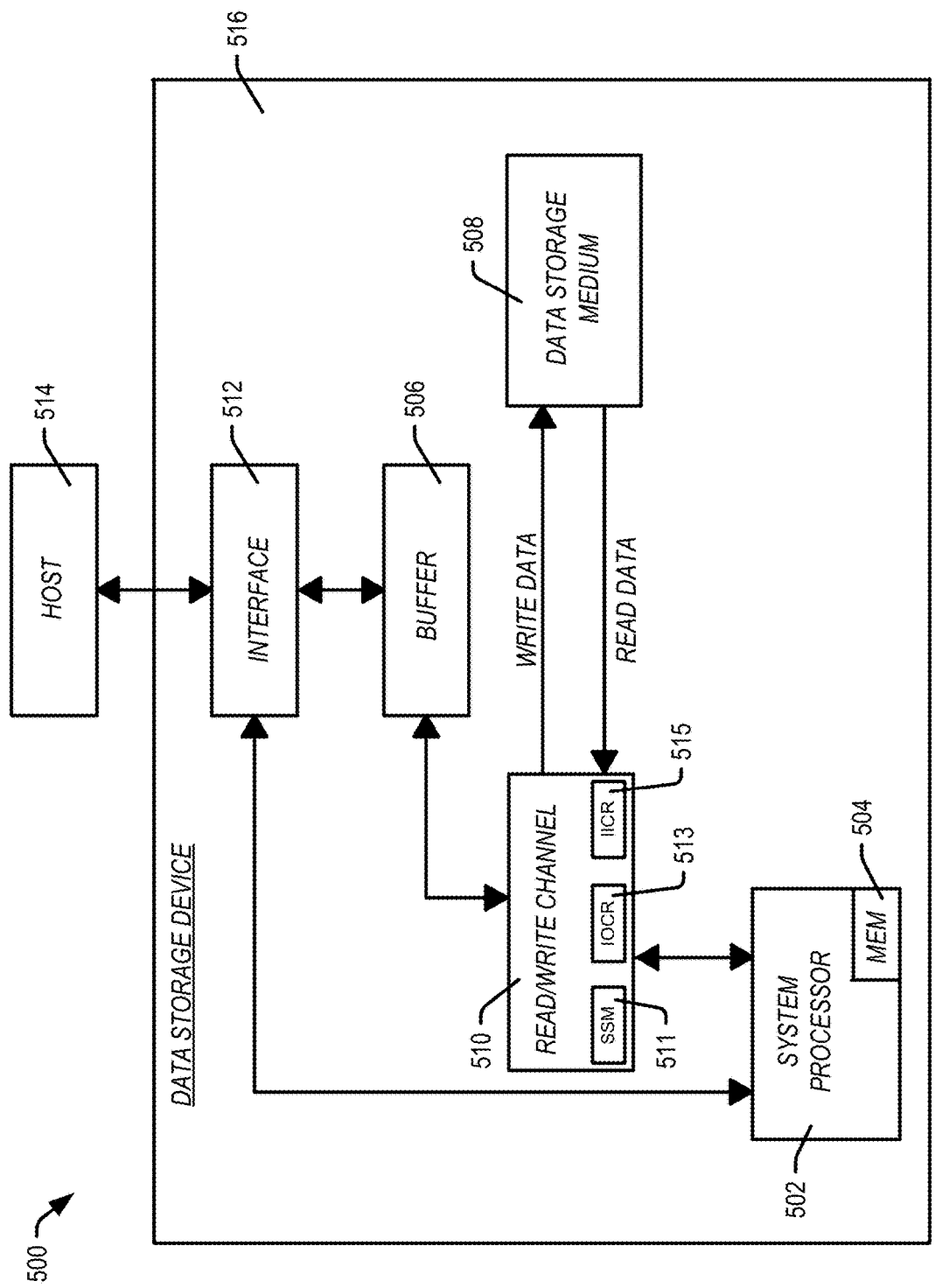
FIG. 5 is a diagram of a system of selective sampling for data recovery, in accordance with certain embodiments of the present disclosure.

FIG. 5 is a diagram of a system of selective sampling for data recovery, generally designated 500, in accordance with certain embodiments of the present disclosure. The system 500 can be an example of a data storage device (DSD), and may be an embodiment of an implementation of the methods 100, 200, and 300. The DSD 516 can optionally connect to be removable from a host device 514, which can be a device or system having stored data, such as a desktop computer, a laptop computer, a server, a digital video recorder, a photocopier, a telephone, a music player, other electronic devices or systems not listed, or any combination thereof. The data storage device 516 can communicate with the host device 514 via the hardware/firmware based host interface circuit 512 that may include a physical connector (not shown) that allows the DSD 516 to be physically connected and disconnected from the host 514.

The DSD 516 can include a system processor 502, which may be a programmable controller, and associated memory 504. The system processor 502 may be part of a system on chip (SOC). A buffer 506 may temporarily store data during read and write operations and can include a command queue. The read/write (R/W) channel 510 can encode data during write operations and reconstruct data during read operations to and from the data storage medium 508. The data storage medium 508 may be a magnetic medium such as a hard disc, a solid state medium such as flash, an optical medium, another type of non-volatile data storage medium, or any combination thereof.

The R/W channel 510 may include an iterative inner code recovery module 515, an iterative outer code recovery module 513, a selective sampling module (SSM) 511, or a combination thereof. The selective sampling module 511 may implement the methods 100, 200, and 300. Further, the read/write channel 510 may be part of a SOC. Further, the read/write channel 510 can include one or more memories (such as DRAM) dedicated for use by the read/write channel 510, which may be utilized to store the samples and associated metrics. Further, all embodiments described herein may be implemented in disc storage systems, solid state memory systems, other storage systems, or transmission systems that use error recovery techniques.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
a data decoding circuit configured to:
generate a first sample for a first unrecovered sector of data from a first decoding of data;
generate a first quality metric for the first sample;
generate a second sample for the first unrecovered sector from a second determination of the data;
generate a second quality metric for the second sample;
compare the first quality metric to the second quality metric;
select one of the first sample and the second sample based on the comparison of the first quality metric and the second quality metric to produce a first selected sample; and
perform an error recovery process on the data utilizing the first selected sample.

2. The device of claim 1 further comprising the data decoding circuit configured to:
generate a third sample for a second unrecovered sector of the data from the first decoding;
generate a third quality metric for the third sample;
generate a fourth sample for the second unrecovered sector of the data from the second decoding;
generate a fourth quality metric for the fourth sample;
select one of the third sample and the fourth sample based on the comparison of the third quality metric and the fourth quality metric to produce a second selected sample; and
perform the error recovery process on the data utilizing the first selected sample and the second selected sample.

3. The device of claim 1 further comprising the data decoding circuit configured to select an error recovery method to implement.

4. The device of claim 1 further comprising the data decoding circuit configured to generate the second sample by combining samples from multiple reads and determining the second sample via one or more post-processing steps.

5. The device of claim 4 further comprising the data decoding circuit configured to determine the second sample via a post-processing step including averaging multiple samples corresponding to a portion of the data represented by the second sample.

6. The device of claim 1 further comprising the data decoding circuit configured to generate a third sample and a third quality metric based on a combination of the first sample and the second sample; and perform the error recovery process utilizing the third sample.

7. The device of claim 1 further comprising the data decoding circuit configured to, any time a sector has failed to be decoded, store data representing a sample and an associated quality metric for each sample.

8. The device of claim 1 further comprising the data decoding circuit configured to store samples and associated metrics for unrecoverable sectors of multiple reads using multiple error recovery techniques.

9. A method comprising:
generating a first sample for a first unrecovered sector of data from a first decoding of data;
generating a first quality metric for the first sample;
generating a second sample for the first unrecovered sector from a second decoding of the data;
generating a second quality metric for the second sample;
comparing the first quality metric to the second quality metric;
selecting one of the first sample and the second sample based on the comparison of the first quality metric and the second quality metric to produce a first selected sample; and
performing an error recovery process on the data utilizing the first selected sample.

10. The method of claim 9 further comprising:
generating a third sample for a second unrecovered sector of the data from the first decoding;
generating a third quality metric for the third sample;
generating a fourth sample for the second unrecovered sector of the data from the second decoding;
generating a fourth quality metric for the fourth sample;
selecting one of the third sample and the fourth sample based on the comparison of the third quality metric and the fourth quality metric to produce a second selected sample; and
performing the error recovery process on the data utilizing the first selected sample and the second selected sample.

11. The method of claim 9 further comprising performing the error recovery process includes performing an iterative outer code recovery.

12. The method of claim 9 further comprising storing the first sample, the first quality metric, the second sample, and the second quality metric to a memory.

13. The method of claim 9 further comprising generating a third sample and a third quality metric based on a combination of the first sample and the second sample; and performing the error recovery process utilizing the third sample when the third quality metric is greater than the first quality metric and the second quality metric.

14. The method of claim 9 further comprising storing data representing a sample and an associated quality metric for each sample for each unrecovered data sector of each data decoding attempt including each data recovery attempt.

15. The method of claim 9 further comprising performing one or more error recovery techniques for only unrecovered sectors during the error recovery process.

16. A device comprising:
a data channel circuit including:
a memory;
an input to receive data;
a data decoding circuit configured to:
generate a first sample for a first unrecovered sector of data from a first decoding of data;
generate a first quality metric for the first sample;
generate a second sample for the first unrecovered sector from a second decoding of the data;
generate a second quality metric for the second sample;
compare the first quality metric to the second quality metric;
select one of the first sample and the second sample based on the comparison of the first quality metric and the second quality metric to produce a first selected sample;
perform an error recovery process on the data utilizing the first selected sample; and
an output to provide recovered codewords from the data decoding circuit.

17. The device of claim 16 further comprising a nonvolatile data storage medium, a data storage controller configured to manage storing data to and retrieving data from the nonvolatile data storage medium, and a host interface configured to connect to and disconnect from a host controlled data bus, the host interface including a physical connector.

18. The device of claim 17 further comprising the nonvolatile data storage medium includes a disc data storage medium.

19. The device of claim 17 further comprising the data decoding circuit configured to perform one or more error recovery techniques, including outer code recovery, for only unrecovered sectors of data during the error recovery process.

20. The device of claim 19 further comprising the data decoding circuit configured to, during each step of the error recovery process, perform a current retry attempt using either samples obtained during a new read attempt or selected samples having a selected metric from an earlier attempt to perform the recovery during the current retry attempt.

* * * * *